E. E. THAYER, DEC'D.
A. B. THAYER, EXECUTOR.
TREE SUPPORT.
APPLICATION FILED MAR. 9, 1914.
1,167,668.
Patented Jan. 11, 1916.
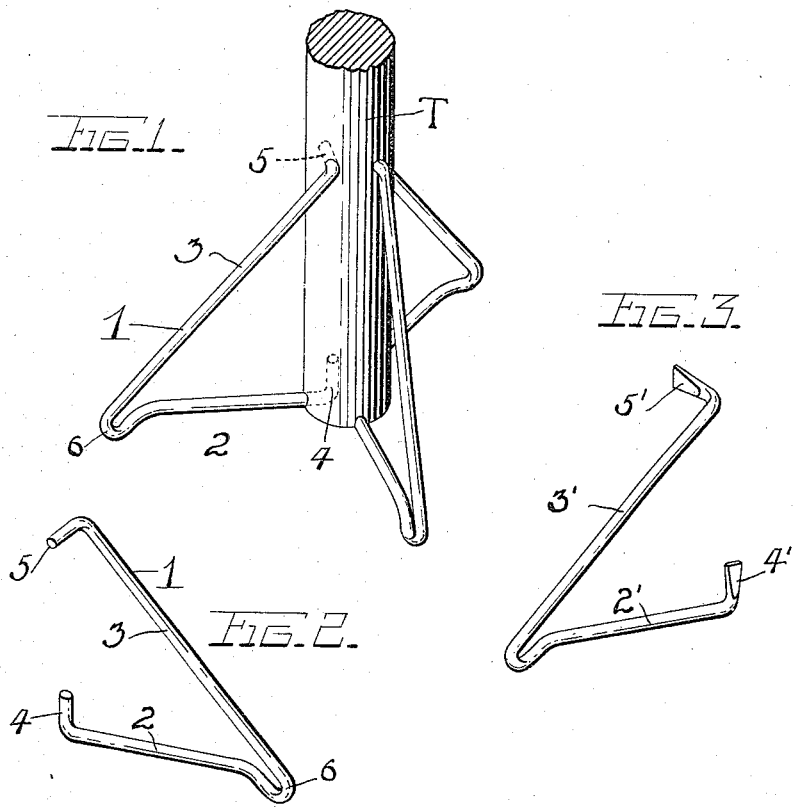
Witnesses
Inventor
EVERETT E. THAYER.

UNITED STATES PATENT OFFICE.

EVERETT E. THAYER, OF JACKSON, MICHIGAN; ARCHIE B. THAYER, EXECUTOR OF SAID EVERETT E. THAYER, DECEASED, ASSIGNOR TO THE THAYER MANUFACTURING CO., OF JACKSON, MICHIGAN.

TREE-SUPPORT.

1,167,668.     Specification of Letters Patent.     Patented Jan. 11, 1916.

Application filed March 9, 1914. Serial No. 823,474.

*To all whom it may concern:*

Be it known that I, EVERETT E. THAYER, a citizen of the United States, residing at Jackson, in the county of Jackson and State of Michigan, have invented certain new and useful Improvements in Tree-Supports; and I do declare the following to be a full, clear, and exact description of the invention, such as will enable others skilled in the art to which it appertains to make and use the same.

This invention relates to improvements in supports for Christmas trees and the primary object of the invention is to provide a simple and inexpensive device of this character which may be constructed of a single piece of wire.

A secondary object is to provide said support with prongs on its opposite ends, said prongs being adapted to be driven into the trunk of the tree and to position said prongs in such a manner as to facilitate the use of a tool for embedding them in said trees.

With the above and other objects in view, the invention resides in certain novel features of construction and combination herein described and claimed and shown in the drawings wherein—

Figure 1 is a perspective view of a portion of a Christmas tree showing the application of my preferred form of support thereto; Fig. 2 is a perspective view of this form of the support detached; and Fig. 3 is a perspective view showing a slight modification of this form.

In Figs. 1 and 2, I have shown each support as formed of a single piece of wire 1 bent to form a substantially horizontal base bar 2, an inclined brace 3, an attaching prong 4 on the free end of the bar 2, a similar prong 5 on the upper end of the brace 3 and a depending loop or foot 6 at the junction of said bar 2 with the brace 3.

As clearly shown in Fig. 2, the prong 4 rises vertically from the free end of the bar 2 while the prong 5, projects laterally from the upper end of the brace 3. By this positioning of the prongs 4 and 5, it will be readily seen that a hammer or other suitable tool, may be employed for driving them into the lower end and one side of the tree trunk T respectively. It is obvious that before the lateral prong 5 of the brace 3 can be driven into the tree the same must be moved arcuately around the tree trunk so that the prong 5 which is adapted to enter the tree transversely of the trunk, will have a sufficient surface or material in which to bite. This movement of the prong 5 will necessarily move the brace 3 from its normal position in the same vertical plane with the base bar 2, and the support being formed of a single piece of wire the brace 3 will consequently be under a constant tension or pressure to resume its normal position.

When the laterally projecting prong 5 has been driven into the tree this pressure directed as it is in the same direction as the prong, will tend to hold the same in position and prevent any casual disengagement from the tree trunk.

In Fig. 3 I have shown my improved support as of the same formation as the form shown in Figs. 1 and 2 with the exception that the prongs 4' and 5', carried respectively by the bar 2' and the brace 3', are flattened for the purpose of causing them to more readily enter the trunk T.

It is to be noted that by constructing the supports in the above described forms, they are readily adaptable for packing in an extremely small package. This becomes an important feature in the marketing of any such device.

From the foregoing description, taken in connection with the accompanying drawings, the construction and use of the various forms of the invention will be readily understood without requiring a more extended explanation.

Having thus described my invention what I claim as new and desire to secure by Letters-Patent is:—

A tree support formed of a single piece of wire bent to form a horizontal base bar and an inclined brace bar normally positioned in the same vertical plane, a depending loop at the juncture of said brace and base bars, the free ends of said base bar being bent upwardly to provide an attaching prong at the base of the tree, and the free end of said brace bar being bent laterally to form an attaching prong which is adapted to be moved arcuately around the tree to engage the side of the same whereby the brace bar is moved from its normal position and will be under tension to return thereto which will consequently exert a constant inward pressure on the laterally projecting prong and hold the same to prevent any casual disengagement when driven into the tree.

In testimony whereof I have hereunto set my hand in presence of two subscribing witnesses.

EVERETT E. THAYER.

Witnesses:
GEORGE H. CURTIS,
HENRY CURTIS.

Copies of this patent may be obtained for five cents each, by addressing the "Commissioner of Patents, Washington, D. C."